(12) United States Patent
Savatsky et al.

(10) Patent No.: US 10,399,052 B2
(45) Date of Patent: Sep. 3, 2019

(54) METHODS OF CONTROLLING POLYOLEFIN MELT INDEX

(71) Applicant: Univation Technologies, LLC, Houston, TX (US)

(72) Inventors: Bruce J. Savatsky, Kingwood, TX (US); Natarajan Muruganandam, Hillsborough, NJ (US); Timothy R. Lynn, Middlesex, NJ (US); James M. Farley, League City, TX (US); Daniel P. Zilker, Jr., Easton, PA (US); Fathi David Hussein, Hilton Head Island, SC (US)

(73) Assignee: Univation Technologies, LLC, Houston, TX (US)

( * ) Notice: Subject to any disclaimer, the term of this patent is extended or adjusted under 35 U.S.C. 154(b) by 98 days.

(21) Appl. No.: 15/528,976

(22) PCT Filed: Nov. 24, 2015

(86) PCT No.: PCT/US2015/062505
§ 371 (c)(1),
(2) Date: May 23, 2017

(87) PCT Pub. No.: WO2016/086039
PCT Pub. Date: Jun. 2, 2016

(65) Prior Publication Data
US 2017/0259236 A1 Sep. 14, 2017

Related U.S. Application Data

(60) Provisional application No. 62/084,280, filed on Nov. 25, 2014.

(51) Int. Cl.
*B01J 8/18* (2006.01)
*B01J 8/24* (2006.01)
*C08F 10/02* (2006.01)

(52) U.S. Cl.
CPC ............... *B01J 8/1809* (2013.01); *B01J 8/24* (2013.01); *C08F 10/02* (2013.01); *B01J 2208/00539* (2013.01)

(58) Field of Classification Search
None
See application file for complete search history.

(56) References Cited

U.S. PATENT DOCUMENTS 7,321,015 B2 † 1/2008 Hoang
2005/0282980 A1 12/2005 Szul et al.
(Continued)

FOREIGN PATENT DOCUMENTS

WO 2008/076386 † 6/2008
WO WO-2009082451 A2 * 7/2009 ............... C08F 10/00
WO WO-2013101541 A1 * 7/2013 ............ C08F 210/16

OTHER PUBLICATIONS

International Search Report and Written Opinion for related PCT Application PCT/US20151062505, dated Mar. 7, 2016 (12 pgs).
(Continued)

*Primary Examiner* — Catherine S Branch
(74) *Attorney, Agent, or Firm* — Brooks, Cameron & Huebsch, PLLC

(57) ABSTRACT

The use of induced condensing agent (ICA) in fluidized bed gas phase reactor systems enables higher production rates but can affect the resulting polyolefins melt index. The effect the increased ICA concentration may have on a melt index may be counteracted, if necessary, by altering the concentration of olefin monomer within the reactor system.

17 Claims, 6 Drawing Sheets

(56) References Cited

U.S. PATENT DOCUMENTS

| | | |
|---|---|---|
| 2010/0144981 A1 | 6/2010 | Savatsky et al. |
| 2011/0118417 A1* | 5/2011 | Liu .................. C08F 10/00 525/240 |
| 2011/0275772 A1† | 11/2011 | Savatsky |
| 2015/0209751 A1 | 7/2015 | Hari et al. |

OTHER PUBLICATIONS

International Preliminary Report on Patentability for related PCT Application PCT/US2015/062505, dated Nov. 4, 2016 (12 pgs).

\* cited by examiner
† cited by third party

METHODS OF CONTROLLING POLYOLEFIN MELT INDEX

This application is a National Stage Application under 35 U.S.C. § 371 of International Application Number PCT/US2015/062505, filed Nov. 24, 2015 and published as WO 2016/086039 on Jun. 2, 2016, which claims the benefit to U.S. Provisional Application 62/084,280, filed Nov. 25, 2014, the entire contents of which are incorporated herein by reference in its entirety.

BACKGROUND

The exemplary embodiments described herein relate to methods for producing polyolefin polymers.

Polyolefin polymers may be produced using gas phase polymerization processes. In a typical gas-phase fluidized bed polymerization process, a gaseous stream containing one or more monomers is continuously passed through the fluidized bed under reactive conditions in the presence of a catalyst. The gaseous stream is withdrawn from the fluidized bed and recycled back into the reactor. Generally, the recycled gas stream is heated in the reactor by the heat of polymerization. This heat may be removed in another part of the cycle (e.g., by a cooling system external to the reactor such as a heat exchanger), so as to maintain the temperature of the resin and gaseous stream inside the reactor below the polymer melting point or the catalyst deactivation temperature.

Heat removal may also help prevent excessive stickiness of polymer particles that may result in agglomeration. Particle agglomerations may lead to the formation of chunks or sheets of polymer that cannot be removed from the reactor as product. Further, such chunks or sheets may fall onto the reactor distributor plate which may impair fluidization of the bed and may lead to a discontinuity event. Additionally, since the polymerization reaction is exothermic, the amount of polymer produced in a fluidized bed polymerization process is related to the amount of heat that can be withdrawn from the reaction zone.

For a time, it was thought that the temperature of the gaseous stream external to the reactor, otherwise known as the recycle stream temperature, could not be decreased below the dew point of the recycle stream without causing problems such as polymer agglomeration or plugging of the reactor system. The dew point of the recycle stream is the temperature at which liquid condensate first begins to form in the gaseous recycle stream, which can be calculated knowing the gas composition and is thermodynamically defined using an equation of state. However, it was found that in some instances a recycle stream may be cooled to a temperature below the dew point in a fluidized bed polymerization process resulting in condensing a portion of the recycle gas stream outside of the reactor. The resulting stream containing entrained liquid can then be returned to the reactor without causing agglomeration or plugging phenomena. The process of purposefully condensing a portion of the recycle stream is known in the industry as "condensed mode" operation. When a recycle stream temperature is lowered to a point below its dew point in condensed mode operation, an increase in polymer production may be possible.

Cooling of the recycle stream to a temperature below the gas dew point temperature produces a two-phase gas/liquid mixture that may have entrained solids contained in both phases. The liquid phase of this two-phase gas/liquid mixture in condensed mode operation is generally entrained in the gas phase of the mixture. Vaporization of the liquid occurs only when heat is added or pressure is reduced. Generally, the vaporization occurs when the two-phase mixture enters the fluidized bed, with the resin providing the required heat of vaporization. The vaporization thus provides an additional means of extracting heat of reaction from the fluidized bed.

The cooling capacity of the recycle gas may be increased further while at a given reaction temperature and a given temperature of the cooling heat transfer medium. This can be performed by adding non-polymerizing, non-reactive materials to the reactor, which are condensable at the temperatures encountered in the process heat exchanger. Such materials are collectively known as induced condensing agents (ICA). Increasing concentrations of an ICA in the reactor cause corresponding increases in the dew point temperature of the reactor gas, which promotes higher levels of condensing for higher (heat transfer limited) production rates from the reactor. However, increasing the ICA concentration in the reactor changes the melt index of the produced polyolefin, which is often undesirable because the melt index of the polyolefin is one of the crucial polymer properties to customers that later produce articles like disposable bags and medical devices therefrom. Even small deviations in melt index outside a specified range can affect the processability of the polyolefin when producing downstream articles.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1A:
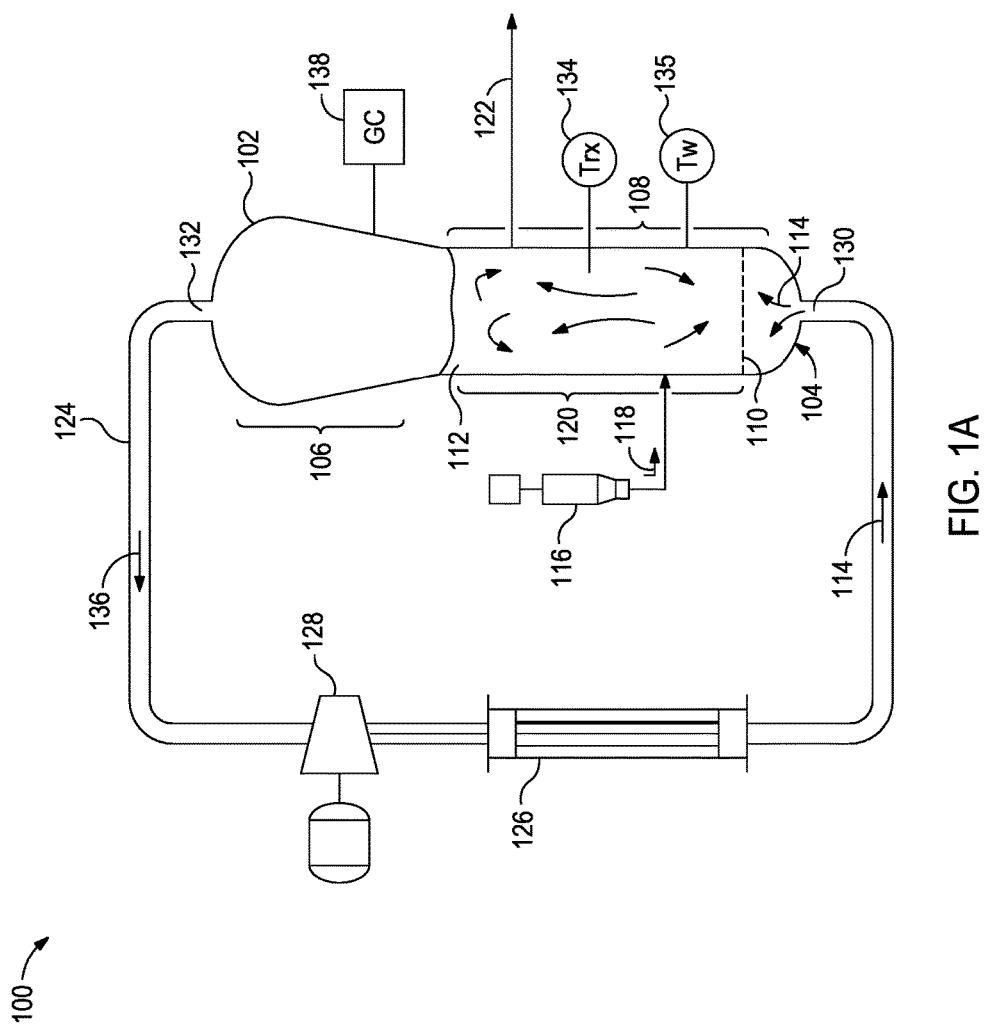
FIG. 1A is a schematic diagram of a polymerization system that can be monitored and controlled in accordance with some of the embodiments described herein.

As discussed above, the use of ICA in fluidized bed gas phase reactors can increase production rate, but also changes the melt index of the polyolefin product produced. In some circumstances, it is known to add hydrogen to the reactor to counteract, in whole or in part, this effect on the melt index. However, it is undesirable to use hydrogen at high rates, or even at all, with some catalyst systems because the use of hydrogen can also adversely impact properties of the polyolefin product produced. For example, hydrogen when used with a multimodal catalyst system, such as a bimodal catalyst system, may shift the location of the molecular weight peaks in a gel permeation chromatography (GPC)

analysis. This shift may be undesirable because it may result in a different product that does not pass critical industry requirements.

Other methods of counteracting the effect of ICA on melt index are disclosed herein. Specifically, a method is disclosed herein comprising contacting in a fluidized bed gas phase reactor an olefin monomer with a catalyst system in the presence of an induced condensing agent (ICA) to produce a first polyolefin having a first melt index, increasing a partial pressure of the ICA in the reactor to produce a second polyolefin having a second melt index, and changing a partial pressure of olefin monomer in the reactor to bring or maintain the second melt index to within 10% of the first melt index.

Without wishing to be bound by theory, one hypothesis about why the use of ICA affects polyolefin melt index is that the ICA increases the solubility of the amorphous polyolefin that surrounds the active catalyst site within the reactor. This increased solubility causes the polyolefin to swell, and this swelling may change the amount of monomer, such as ethylene, that is dissolved into the amorphous phase around the active catalyst site. A change in monomer concentration around the catalyst site may affect the relative production rates of the high molecular weight polyolefin and low molecular weight polyolefin when a multimodal or bimodal catalyst system is used, and this change in relative production rates changes the polyolefin melt index.

Consistent with this theory, it is believed that the effect of ICA on polyolefin melt index may be counteracted by altering the monomer concentration within the reactor. For example, operating the reactor at a lower monomer partial pressure could reduce the amount of monomer that is dissolved in the amorphous polyolefin, while operating the reactor at a higher monomer partial pressure could increase the amount of monomer dissolved. This increase or decrease in dissolved monomer could affect the relative amount of high and low molecular weight polyolefin produced and be used to control polyolefin melt index. Thus, monomer partial pressure could be used to counteract the effect of ICA on polyolefin melt index, while still allowing the higher production rates achieved by operating at higher ICA concentrations.

Monomer partial pressure could be used in place of, or in addition to, other means of counteracting the effect of ICA on melt index. These means include, for example, the use of hydrogen. As discussed above, with some catalyst systems the use of hydrogen is undesired. Thus, the ability to counteract the effect of ICA on melt index by altering monomer concentration could mitigate or eliminate the need to use hydrogen, which could be quite advantageous with some catalyst systems. Thus, in embodiments, hydrogen is not affirmatively added to the reactor system. In additional embodiments, hydrogen is added and a ratio of a hydrogen mol % of total reactor gas to an olefin monomer mol % of total reactor gas is increased or decreased as needed to achieve the desired polyolefin melt index.

Monomer partial pressure could also be used in place of, or in addition to, other means of counteracting the effect of ICA on melt index such as adjusting the ratio of catalysts used in a multimodal catalyst system. For example, a multimodal catalyst system may include a bimodal catalyst system comprising a high molecular weight (HMW) catalyst and a low molecular weight (LMW) catalyst. The mole ratio of the HMW catalyst and the LMW catalyst ($HMW_{mol}$:$LMW_{mol}$) in the reactor could be altered to counteract the effect of ICA on melt index. This ratio could be altered, for example, by adding more HMW or more LMW catalyst. Additional HMW or LMW catalyst could be added in-line as a trim catalyst or added by any other suitable means. In some processes, it may be undesired to add additional HMW or LMW catalyst because, for example, the particular catalyst component could be quite expensive. Thus, the ability to counteract the effect of ICA on melt index by altering monomer concentration could mitigate or eliminate the need to add additional catalyst, which is again quite advantageous with some catalyst systems.

Additional means for counteracting the effect of ICA on melt index that may be used in embodiments include adjusting the reactor temperature, reactor residence time, comonomer concentration, or any combination of these. Any combination of means disclosed herein may be used. The particular combination of means used to counteract the effect of ICA on melt index may be readily determined through routine experimentation. It is not necessary to know, at the outset, precisely which variable or combination of variables to change or how to change them. Rather, a particular catalyst system could be analyzed through basic experimentation to understand how the presence of ICA affects the polyolefin properties, such as melt index. With that analysis, the preferred variable or combination of variables to use and in what amounts could be readily determined through additional routine experimentation.

As used herein, the term "ICA" refers to the total ICA in the reactor and encompasses compositions with one or more ICA components. As used herein, the term "ICA component" refers to individual components of an ICA. For example, an ICA may include isopentane, n-butane, or a combination thereof. Exemplary ICA components suitable for use in the methods described herein may include, but are not limited to, n-butane, isobutane, n-pentane, isopentane, hexane, isohexane, and other hydrocarbon compounds that are similarly non-reactive in the polymerization process.

With reference to a product being produced by a continuous reaction, the expression "instantaneous" value of a property of the product herein denotes the value of the property of the most recently produced quantity of the product. The most recently produced quantity typically undergoes mixing with previously produced quantities of the product before a mixture of the recently and previously produced product exits the reactor. In contrast, with reference to a product being produced by a continuous reaction, "average" (or "bed average") value (at a time "T") of a property herein denotes the value of the property of the product that exits the reactor at time T.

As used herein, the term "polyethylene" denotes a polymer of ethylene and optionally one or more $C_3$-$C_{18}$ alpha-olefins, while the term "polyolefin" denotes a polymer of one or more $C_2$-$C_{18}$ alpha-olefins.

As used herein, the term "melt index" refers to a measure of the use of flow of the melt of the thermoplastic polymer. Melt index may be measured according to ASTM D1238-13 at any suitable weight and temperature. Generally, the melt index of polyolefins is measured at 2.16 kg at 190° C., 5 kg at 190° C., or 21.6 kg at 190° C.

Reactor

The methods described herein may be used in any number of pilot plant or commercial size reactors including any number of designs. For example, the model can be used in commercial-scale reactions, such as gas-phase fluidized-bed polymerization reactions, that can be monitored and optionally also controlled in accordance with the invention. Some such reactions can occur in a reactor having the geometry of the fluidized bed reactor 102 discussed with respect to FIG. 1A. In other embodiments, a reactor is monitored and optionally also controlled in accordance with the invention while it operates to perform polymerization using any of a variety of different processes (e.g., slurry, or gas phase processes).

FIG. 1A is a schematic diagram of a polymerization system 100 that can be monitored and controlled in accordance with embodiments described herein. The polymerization system 100 includes a fluidized bed reactor 102. The fluidized bed reactor 102 has a bottom end 104, a top expanded section 106, a straight section 108, and a distributor plate 110 within the straight section 108. A fluidized bed 112 of granular polymer and catalyst particles is contained within the straight section 108, and may optionally extend slightly into the top expanded section 106. The bed is fluidized by the steady flow of recycle gas 114 through the distributor plate 110. The flow rate of the recycle gas 114 is regulated to circulate the fluidized bed 112, as illustrated in FIG. 1A. In some implementations, a superficial gas velocity of about 1 ft/sec to about 3 ft/sec is used to maintain a fluidized bed 112 in the reactor 102 while operating the reactor 102 at a total pressure of about 300 psi.

The polymerization system 100 has one or more catalyst feeders 116 for controlling the addition of polymerization catalyst 118 to a reaction zone 120 within the fluidized bed 112. Within the reaction zone 120, the catalyst particles react with a primary monomer (e.g., ethylene) and optionally a comonomer and other reaction gases (e.g., hydrogen) to produce the granular polymer particles. As new polymer particles are produced, other polymer particles are continually withdrawn from the fluidized bed 112 through a product discharge system 122. The fluidized bed 112 may be maintained at a constant height by withdrawing a portion of the fluidized bed 112 at a rate equal to the rate of formation of particulate product. The product may be removed continuously or nearly continuously via a series of valves (not shown) into a fixed volume chamber (not shown), which is simultaneously vented back to the reactor. This allows for highly efficient removal of the product, while recycling a large portion of the unreacted gases back to the reactor.

After passing through the product discharge system 122, the polymer granules may be degassed (or "purged") with a flow of inert gas such as nitrogen to remove substantially all of the dissolved hydrocarbon materials. In some instances, the polymer granules may be treated with a small stream of humidified nitrogen to deactivate any trace quantities of residual catalyst.

The polymerization system 100 also has a cooling loop which includes a recycle gas line 124, a cooler 126 (such as a circulating gas cooler), and a compressor 128, coupled with the fluidized bed reactor 102. During operation, the cooled circulating gas from the cooler 126 flows through inlet 130 into the fluidized bed reactor 102, then propagates upward through the fluidized bed 112 and out from the fluidized bed reactor 102 via outlet 132.

The top expanded section 106 is also known as a "velocity reduction zone," and is designed to minimize the quantities of particle entrainment from the fluidized bed. The diameter of the top expanded section 106 generally increases with the distance from straight section 108. The increased diameter causes a reduction in the speed of the recycle gas 114, which allows most of the entrained particles to settle back into the fluidized bed 112, thereby minimizing the quantities of solid particles that are "carried over" from the fluidized bed 112 through the recycle gas line 124. Finer entrained particles and dust may optionally be removed in a cyclone and/or fines filter (not shown). In some instances, a screen (not shown) may be included upstream of the compressor 128 to remove larger material.

To maintain a reactor temperature, the temperature of the recycle gas 114 may be continuously adjusted up or down to accommodate any changes in the rate of heat generation due to the polymerization. One or more temperature sensors 134 may be located in the fluidized bed, and used with a control system and the cooling loop to control the temperature $T_{rx}$ of the fluidized bed 112 near the process set-point. Heated reactor gas 136, which carries heat energy from the fluidized bed reactor 102, is withdrawn from the outlet 132 and is pumped by the compressor 128 to the cooler 126 wherein the temperature of the heated reactor gases 136 is reduced and at least some of the ICA present are condensed to a liquid. The recycle gas 114 from the cooler 126, including any condensed liquids, flows to the reactor inlet 130 to cool the fluidized bed 112. Temperature sensors (not shown) near the inlet and outlet of the cooler 126 may provide feedback to a control system (FIG. 1B) to regulate the amount by which cooler 126 reduces the temperature of the recycle gas 114 entering the fluidized bed reactor 102.

The fluidized bed reactor 102 may also include skin temperature sensors 135, mounted in positions along a wall of the straight section 108 of the fluidized bed reactor 102 so as to protrude into the bed from the reactor wall by a small amount (e.g., about one eighth to one quarter of an inch). The skin temperature sensors 135 may be configured and positioned to sense the temperature $T_w$ of the resin near the wall of the fluidized bed reactor 102 during operation.

The temperature sensors 134 in the fluidized bed 112 can include a resistance temperature sensor positioned and configured to sense bed temperature during reactor operation at a location within the fluidized bed reactor 102 away from the reactor wall. The resistance temperature sensor can be mounted so as to protrude into the bed more deeply than the skin temperature sensors 135 (e.g., about 8 to 18 inches away from the reactor wall).

Other sensors and other apparatuses may be employed to measure other reaction parameters during a polymerization reaction. The reaction parameters may include instantaneous and bed-averaged resin product properties (e.g., melt index and density of the polymer resin product being produced by the polymerization system 100 during a polymerization reaction). Resin product properties are conventionally measured by periodically sampling the resin as it exits the reactor (e.g., about once per hour), and performing the appropriate tests in a quality control laboratory.

Other measured reaction parameters may include reactor gas composition (e.g., concentrations and partial pressures of reactant gases, ICA, inert gases, and isomers of other materials, such as nitrogen, inert hydrocarbon, and the like). The reactor gas composition may be measured with a gas chromatograph system 138.

The process control variables may be controlled to obtain the desired catalyst productivity for the polymerization system 100 and properties for the resin. For example, the parameters used to control gas phase composition within the fluidized bed reactor 102 can include the concentration and composition of the ICA and comonomer, the partial pressure of monomer, and the type and properties of catalysts, and the temperature of the reaction process. For example, it is known that a polymerization reaction during a transition may be controlled by controlling process control variables to ensure that the product (e.g., the granular resin) has properties compliant with an initial specification set at the start of the transition, the product produced during the transition ceases to comply with the initial specification set at a first time, and the product has properties compliant with a final specification set at the end of the transition.

Figure 1B:
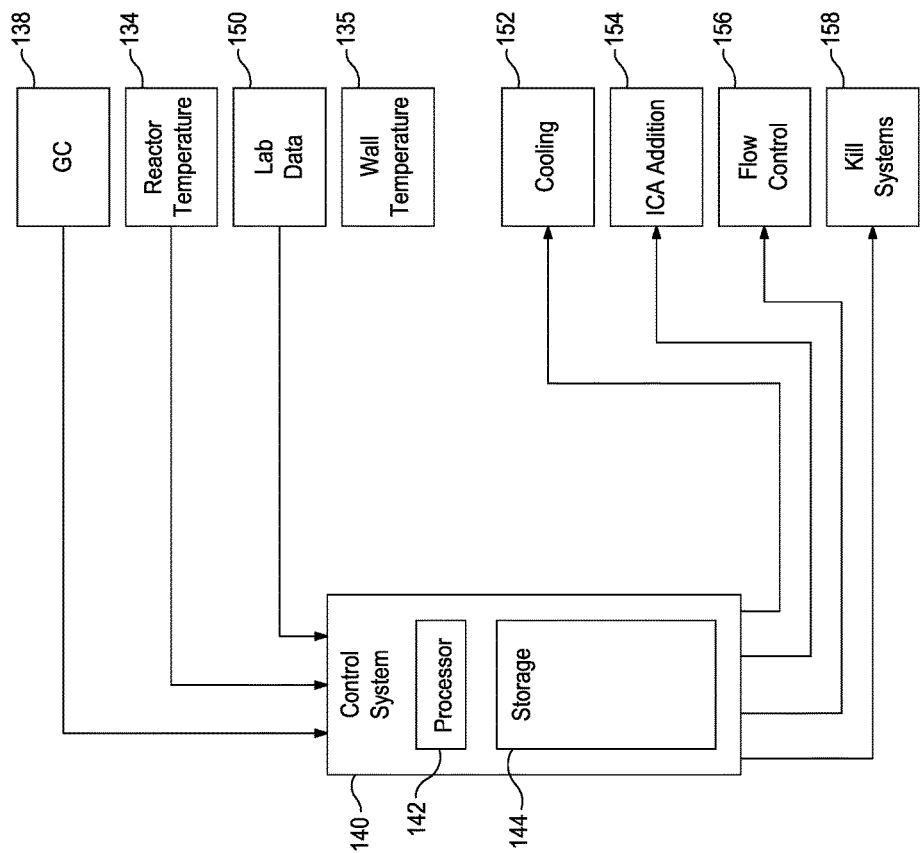
FIG. 1B is a block diagram of a control system that can be used to control the polymerization system in accordance with some of the embodiments described herein.

FIG. 1B is a block diagram of a control system 140 that can be used to control the polymerization system 100. The control system 140 may be a distributed control system (DCS), a direct digital controller (DDC), a programmable logic controller (PLC), or any other suitable system or combination of systems. The control system 140 has a processor 142 that implements machine readable instructions from a storage system 144. Illustrative processors may include a single core processor, a multiple core processor, a virtual processor, a virtual processor in a cloud implementation, an application specific integrated circuit (ASIC), or any combination of these systems. Illustrative storage systems 144 can include random access memory (RAM), read only memory (ROM), hard drives, virtual hard drives, RAM drives, cloud storage systems, optical storage systems, physically encoded instructions (for example, in an ASIC), or any combination of these systems.

Adjustments to control settings may be determined based on the output of temperature sensors 134 and 135, the gas chromatograph system 138, and lab data 150, among others. After determining new control settings, the control system 140 may make, or recommend, adjustments, for example, to the process cooling systems 152, the ICA addition and recycling systems 154, flow control systems 156, and kill systems 158, among others.

One skilled in the art would readily recognize that the reactor and associated methods may be an element of a staged reactor employing two or more reactors in series, wherein one reactor may produce, for example, a high molecular weight polyolefin and another reactor may produce a low molecular weight polyolefin.

Polyolefin Production Methods

Polyolefin polymerization may be performed by contacting in a reactor (e.g., fluidized bed reactor 102 of FIG. 1A) an olefin monomer and optionally a comonomer with a catalyst system in the presence of ICA and optionally hydrogen. The individual flow rates of olefin monomer, optional comonomer, optional hydrogen, and ICA (or components thereof) may be controlled to maintain fixed gas composition targets. The concentration of all gases may be measured with a chromatograph. A solid catalyst, a catalyst slurry, or liquid solution of the catalyst may, for example, be injected directly into the reactor using a carrier fluid (e.g., purified nitrogen) or a mixture of a carrier fluid and ICA, where the feed rate of catalyst may be adjusted to change or maintain the catalyst inventory in the reactor.

In some instances, the catalyst system may comprise a metallocene catalyst (detailed further herein). In some embodiments when using a metallocene catalyst, decreasing the relative concentration of olefin monomer in the reactor may be achieved by increasing the partial pressure of hydrogen ($H2_{PP}$) in the reactor, which increases the ratio of the hydrogen mol % of total reactor gas to the olefin monomer mol % of total reactor gas ($H2_{mol}$:monomer$_{mol}$). In some embodiments when using a metallocene catalyst, decreasing the relative concentration of olefin monomer in the reactor may also be achieved by decreasing the partial pressure of olefin monomer (monomer$_{PP}$) in the reactor. In some instances where a comonomer is also utilized, the ratio of the olefin monomer mol % of total reactor gas to the comonomer mol % of total reactor gas (monomer$_{mol}$:comonomer$_{mol}$) may be maintained or substantially maintained so as to produce the desired polyolefin.

In some instances, the ICA concentration in the reactor may be about 1 mol % of total reactor gas or greater, about 1 mol % to about 30 mol % of total reactor gas, about 3 mol % to about 30 mol % of total reactor gas, about 6 mol % to about 30 mol % of total reactor gas, about 8 mol % to about 30 mol % of total reactor gas, or about 10 mol % to about 30 mol % of total reactor gas.

In some embodiments, the olefin partial pressure may be at up to about 600 psi (4138 kPa), about 100 psi (690 kPa) to about 600 psi (4138 kPa), about 200 psi (1379 kPa) to about 400 psi (2759 kPa), or about 150 psi (1724 kPa) to about 250 psi (2414 kPa).

When present, the comonomer may be at any relative concentration to the olefin monomer that will achieve the desired weight percent incorporation of the comonomer into the finished polyolefin. In some embodiments, the comonomer may be present with the olefin monomer in a mole ratio range in the gas phase of from about 0.0001 to about 50 (comonomer to olefin monomer), from about 0.0001 to about 5 in another embodiment, from about 0.0005 to about 1.0 in yet another embodiment, and from about 0.001 to about 0.5 in yet another embodiment.

The olefin monomer or comonomers, for example, may contain from 2 to 18 carbon atoms in some embodiments. In another embodiment, the olefin monomer may be ethylene, and a comonomer may comprise from 3 to 12 carbon atoms. In yet another embodiment, the olefin monomer may be ethylene or propylene, and a comonomer may comprise from 4 to 10 carbon atoms. In another embodiment, the olefin monomer may be ethylene or propylene, and a comonomer may comprise from 4 to 8 carbon atoms. Exemplary alpha-olefins that may be utilized as a comonomer in embodiments described herein may include, but are not limited to, ethylene, propylene, 1-butene, 1-pentene, 1-hexene, 1-heptene, 1-octene, 4-methylpent-1-ene, 1-decene, 1-dodecene, 1-hexadecene, and the like, and any combination thereof. Additionally, a polyene may be used as a comonomer according to some embodiments described herein. Exemplary polyenes may include, but are not limited to, 1,3-hexadiene, 1,4-hexadiene, cyclopentadiene, dicyclopentadiene, 4-vinylcyclohex-1-ene, methyloctadiene, 1-methyl-1,6-octadiene, 7-methyl-1,6-octadiene, 1,5-cyclooctadiene, norbornadiene, ethylidene norbornene, 5-vinylidene-2-norbornene, 5-vinyl-2-norbornene, and olefins formed in situ in the polymerization medium. When olefins are formed in situ in the polymerization medium, the formation of polyolefins containing long chain branching may occur. Additional examples of comonomers may include isoprene, styrene, butadiene, isobutylene, chloroprene, acrylonitrile, and cyclic olefins. Combinations of the foregoing may be utilized in the methods described herein.

Examples of polymers that can be produced in accordance with the method described herein may include the following: homopolymers and copolymers of $C_2$-$C_{18}$ alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; polychloroprene; norbornene homopolymers and copolymers with one or more $C_2$-$C_{18}$ alpha olefins; and terpolymers of one or more $C_2$-$C_{18}$ alpha olefins with a diene. In some embodiments, the polyolefin produced by the method described herein may include olefin homopolymers (e.g., homopolymers of ethylene or propylene). In some instances, the polyolefin produced may be copolymers, terpolymers, and the like of the olefin monomer and the comonomer. In some embodiments, the polyolefin produced may be a polyethylene or a polypropylene. Exemplary polyethylenes produced by the methods described herein may be homopolymers of ethylene or interpolymers of ethylene and at least one alpha-olefin (comonomer) wherein the ethylene content may be at least about 50% by weight of the total monomers involved. Exemplary polypropylenes produced by the methods described herein may be homopolymers of propylene or interpolymers of propylene and at least one alpha-olefin (comonomer) wherein the propylene content may be at least about 50% by weight of the total monomers involved.

The amount of hydrogen used in some polymerization processes is an amount necessary to achieve the desired melt index (or molecular weight) of the final polyolefin resin. In some embodiments, the $H2_{mol}$:$monomer_{mol}$ may be greater than about 0.00001, greater than about 0.0005, greater than about 0.001, less than about 10, less than about 5, less than about 3, or less than about 0.10, wherein a desirable range may comprise any combination of any upper mole ratio limit with any lower mole ratio limit described herein. Expressed another way, the amount of hydrogen in the reactor at any time may range to up to about 10 ppm in some embodiments, up to about 100 or about 3000 or about 4000 or about 5000 ppm in other embodiments, between about 10 ppm and about 5000 ppm in yet another embodiment, or between about 500 ppm and about 2000 ppm in another embodiment.

Catalyst

Exemplary catalysts suitable for use in the embodiments described herein may include, but are not limited to, Ziegler Natta catalysts, chromium based catalysts, vanadium based catalysts (e.g., vanadium oxychloride and vanadium acetylacetonate), metallocene catalysts and other single-site or single-site-like catalysts, cationic forms of metal halides (e.g., aluminum trihalides), anionic initiators (e.g., butyl lithiums), cobalt catalysts and mixtures thereof, Nickel catalysts and mixtures thereof, rare earth metal catalysts (i.e., those containing a metal having an atomic number in the Periodic Table of 57 to 103), such as compounds of cerium, lanthanum, praseodymium, gadolinium and neodymium. A single catalyst may be used, or a mixture of catalysts may be employed, if desired. The catalyst may be soluble or insoluble, supported or unsupported. Further, the catalyst may be a prepolymer, spray dried with or without a filler, a liquid, or a solution, slurry/suspension, or dispersion.

The methods disclosed herein may be particularly useful with multimodal catalyst systems, such as bimodal catalyst systems. U.S. Pat. Nos. 6,605,675, 6,846,886, 6,956,089, 6,689,847, 6,274,684, 6,841,631, 6,894,128, 6,534,604, and PCT publications WO 2002/046243 and WO 2001/030861, generally, describe processes and techniques for making multimodal catalyst systems, and polymerizing with these multimodal catalyst systems. For example, these references discuss bimodal catalyst compositions comprising a combination of a Group 15 atom and metal containing compound (a bisamide compound) and a metallocene compound.

A multimodal catalyst system useful herein may include one or more Group 15 atom and metal containing compounds. The Group 15 atom and metal containing compounds generally includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 or 16 atom through another group.

At least one of the Group 15 atoms may be also bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

The Group 15 atom and metal containing compound of the present disclosure may also be represented by the formulae:

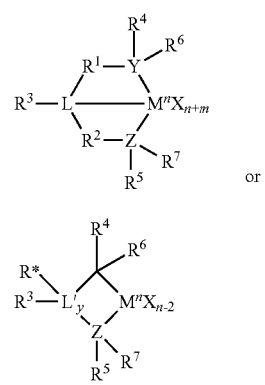

Formula I or

Formula II wherein

M is a Group 3 to 12 transition metal or a Group 13 or 14 main group metal, preferably a Group 4, 5, or 6 metal, and more preferably a Group 4 metal, and most preferably zirconium, titanium or hafnium, each X is independently a leaving group, preferably, an anionic leaving group, and more preferably hydrogen, a hydrocarbyl group, a heteroatom or a halogen, and most preferably an alkyl.

y is 0 or 1 (when y is 0 group L' is absent), n is the oxidation state of M, preferably +3, +4, or +5, and more preferably +4, m is the formal charge of the YZL or the YZL' ligand, preferably 0, −1, −2 or −3, and more preferably −2, L is a Group 15 or 16 element, preferably nitrogen, L' is a Group 15 or 16 element or Group 14 containing group, preferably carbon, silicon or germanium, Y is a Group 15 element, preferably nitrogen or phosphorus, and more preferably nitrogen, Z is a Group 15 element, preferably nitrogen or phosphorus, and more preferably nitrogen, $R^1$ and $R^2$ are independently a $C_1$ to $C_{20}$ hydrocarbon group, a heteroatom containing group having up to twenty carbon atoms, silicon, germanium, tin, lead, or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group. $R^1$ and $R^2$ may also be interconnected to each other.

$R^3$ is absent or a hydrocarbon group, hydrogen, a halogen, a heteroatom containing group, preferably a linear, cyclic or branched alkyl group having 1 to 20 carbon atoms, more preferably R3 is absent, hydrogen or an alkyl group, and most preferably hydrogen $R_4$ and $R_5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, for example $PR_3$, where R is an alkyl group, $R_1$ and $R_2$ may be interconnected to each other, and/or $R_4$ and $R_5$ may be interconnected to each other, $R_6$ and $R_7$ are independently absent, hydrogen, an alkyl group, halogen, heteroatom, or a hydrocarbyl group, preferably a linear, cyclic or branched alkyl group having 1 to 20 carbon atoms, and more preferably absent, and R* is absent, or is hydrogen, a Group 14 atom containing group, a halogen, or a heteroatom containing group.

By "formal charge of the YZL or YZL' ligand", it is meant the charge of the entire ligand absent the metal and the leaving groups X.

By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

An alkyl group may be linear, branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

$R^4$ and $R^5$ may be independently a group represented by the following formula:

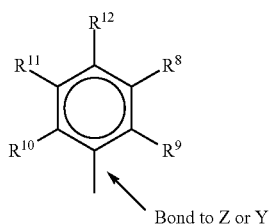

wherein $R^8$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. $R^9$, $R^{10}$ and $R^{12}$ may be independently a methyl, ethyl, propyl or butyl group (including all isomers), in a preferred embodiment $R^9$, $R^{16}$ and $R^{12}$ are methyl groups, and $R^8$ and $R^{11}$ are hydrogen.

$R^4$ and $R^5$ may also both a group represented by the following formula:

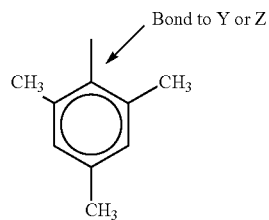

In this embodiment, M is a Group 4 metal, preferably zirconium, titanium or hafnium, and even more preferably zirconium; each of L, Y, and Z is nitrogen; each of $R^1$ and $R^2$ is —$CH_2$—$CH_2$—; $R^3$ is hydrogen; and $R^6$ and $R^7$ are absent.

The Group 15 atom and metal containing compound may be represented by the structure below:

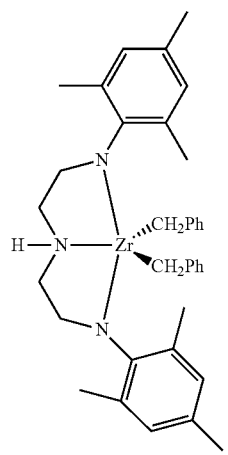

In the structure above, Ph equals phenyl.

The catalyst composition of the present disclosure may include one or more metallocene compounds. Generally, metallocene compounds include half and full sandwich compounds having one or more ligands bonded to at least one metal atom. Typical metallocene compounds are generally described as containing one or more ligand(s) and one or more leaving group(s) bonded to at least one metal atom.

The ligands are generally represented by one or more open, acyclic, or fused ring(s) or ring system(s) or a combination thereof. These ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably, the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the catalyst composition of the present disclosure may include one or more metallocene catalyst compounds represented by the formula:

$L^A L^B MQ_n$ where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopenta-cyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of π-bonding to M. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of ligand that is bonded to M. In one embodiment, only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that the formula above represents a neutral metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the catalyst composition of the present disclosure may include one or more metallocene catalyst compounds where $L^A$ and $L^B$ of the formula above are bridged to each other by at least one bridging group, A, as represented by the following formula:

$L^A A L^B MQ_n$

The compounds of this formula are known as bridged metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by R'$_2$C, R'$_2$Si, R'$_2$Si R'$_2$Si, R'$_2$Ge, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged metallocene catalyst compounds have two or more bridging groups A (EP 664 301 B1).

In another embodiment, the metallocene catalyst compounds are those where the R substituents on the ligands $L^A$ and $L^B$ of the formulas above are substituted with the same or different number of substituents on each of the ligands. In another embodiment, the ligands $L^A$ and $L^B$ of the formulas above are different from each other.

Other metallocene catalyst compounds and catalyst systems useful in the present disclosure may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In another embodiment, the catalyst compositions of the present disclosure may include bridged heteroatom metallocene compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In another embodiment, the catalyst composition of the present disclosure includes one or more metallocene catalyst compounds represented by the following formula:

$$L^C AJMQ_n$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted ligand bonded to M; J is bonded to M; A is bonded to J and $L^C$; J is a heteroatom ancillary ligand; and A is a bridging group; Q is a univalent anionic ligand; and n is the integer 0, 1 or 2. In the formula above, $L^C$, A and J form a fused ring system. In an embodiment, $L^C$ may be as defined above for $L^A$. A, M and Q of may also be as defined above.

J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In an embodiment, the metallocene catalyst compounds are heterocyclic ligand complexes where the ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these metallocene catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In one embodiment, the metallocene catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the metallocene catalyst compounds are those described in PCT publications WO 99/01481 and WO 98/42664, which are fully incorporated herein by reference.

In another embodiment, the metallocene catalyst compound is a complex of a metal, preferably a transition metal, a ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In another embodiment, the catalyst composition of the present disclosure includes one or more metallocene catalyst compounds is represented by the following formula:

$$L^D MQ_2(YZ)X_n$$

where M is a Group 3 to 16 metal, preferably a Group 4 to 12 transition metal, and most preferably a Group 4, 5 or 6 transition metal; $L^D$ is a ligand that is bonded to M; each Q is independently bonded to M and $Q_2(YZ)$ forms a ligand, preferably a unicharged polydentate ligand; or Q is a univalent anionic ligand also bonded to M; X is a univalent anionic group when n is 2 or X is a divalent anionic group when n is 1; n is 1 or 2.

In this formula, L and M may be as defined above. Q may be as defined above, or may be selected from the group consisting of —O—, —NR—, —$CR_2$— and —S—; Y is either C or S. Z is selected from the group consisting of —OR, —$NR_2$, —$CR_3$, —SR, —$SiR_3$, —$PR_2$, —H, and substituted or unsubstituted aryl groups, with the proviso that when Q is —NR— then Z is selected from one of the group consisting of —OR, —$NR_2$, —SR, —$SiR_3$, —$PR_2$ and —H. R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment, the metallocene catalyst compounds are those described in PCT publications WO 99/01481 and WO 98/42664, which are fully incorporated herein by reference.

Useful Group 6 metallocene catalyst systems are described in U.S. Pat. No. 5,942,462, which is incorporated herein by reference.

It is also contemplated that in one embodiment the metallocene catalysts, described above, include their structural or optical or enantiomeric isomers (meso and racemic isomers, for example see U.S. Pat. No. 5,852,143, incorporated herein by reference) and mixtures thereof.

A multimodal catalyst system as used herein may comprise a portion of the catalyst that is a trim solution, i.e. the portion that is a trim solution may be added in-line to the remaining catalyst solution or slurry, as is known in the art.

The catalysts may be used with cocatalysts and promoters (e.g., alkylaluminums, alkylaluminum halides, alkylaluminum hydrides, and aluminoxanes). The activator may be, for example, methylaluminoxane.

In some instances, the one or more catalysts may be combined with up to about 10 wt % of one or more antistatic agents as are known in the art, such as a metal-fatty acid compound (e.g., an aluminum stearate), based upon the weight of the catalyst system (or its components). Other metals that may be suitable include other Group 2 and Group 5-13 metals. One or more antistatic agents may be added directly to the reactor system as well.

Supports may be present as part of the catalyst system. In some embodiments, the support material may be a porous support material. Non-limiting examples of support materials include inorganic oxides and inorganic chlorides, and in particular such materials as talc, clay, silica, alumina, magnesia, zirconia, iron oxides, boria, calcium oxide, zinc oxide, barium oxide, thoria, aluminum phosphate gel, and polymers such as polyvinylchloride and substituted polystyrene, functionalized or crosslinked organic supports such as polystyrene divinyl benzene polyolefins or polymeric compounds, and mixtures thereof, and graphite, in any of its various forms.

In some instances, supported catalyst(s) may be combined with activators by tumbling and/or other suitable means, optionally with up to about 2.5 wt % (by weight of the catalyst composition) of an antistatic agent. Exemplary antistatic agents may include, but are not limited to, an ethoxylated or methoxylated amine (e.g., KEMAMINE AS-990, available from ICI Specialties) and polysulfone copolymers in the OCTASTAT family of compounds, more specifically Octastat 2000, 3000, and 5000 (available from Octel).

In some embodiments, the antistatic agent may be mixed with the catalyst and fed into the reactor. In other embodiments, the antistatic agent may be fed into the reactor separate from the catalyst. One advantage of this method of addition is that it permits on-line adjustment of the level of the additive. The antistatic agents may individually be in a solution, slurry, or as a solid (preferably as a powder) before introduction into the reactor.

In various embodiments, a polymerization reaction according to the methods described herein may optionally employ other additives, such as inert particulate particles.

In some embodiments, the polymerization reaction may be performed at a reactor pressure of up to about 600 psi (4138 kPa), about 100 psi (690 kPa) to about 600 psi (4138 kPa), about 200 psi (1379 kPa) to about 400 psi (2759 kPa), or about 250 psi (1724 kPa) to about 350 psi (2414 kPa).

In some embodiments, the polymerization reaction temperature may be about 30° C. to about 120° C., about 60° C. to about 115° C., about 70° C. to about 110° C., or about 70° C. to about 105° C.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

A series of polyolefin production runs were performed using hydrogen, ethylene monomer, isopentane as the ICA, and a hafnium metallocene catalyst. The isopentane partial pressure was adjusted between 6 psi and 40 psi. Generally, as the isopentane partial pressure increased, the polyolefin productivity increased and the melt index decreased. Specifically, the polyolefin productivity increased by about 14% when comparing 6 psi isopentane partial pressure to 40 psi isopentane partial pressure.

In a second series of polyolefin production runs, similar to the first, the $H2_{mol}$:monomer$_{mol}$ was increased by increasing $H2_{PP}$ by an amount sufficient to maintain the melt index of the produced polyolefin. The polyolefin productivity increased by about 24% when comparing 6 psi isopentane partial pressure to 40 psi isopentane partial pressure where the melt index was maintained by increased $H2_{PP}$.

These examples demonstrate that when using a metallocene catalyst, the $H2_{mol}$:monomer$_{mol}$ may be increased to maintain the polyolefin melt index. Further, when $H2_{PP}$ is increased so as to increase the $H2_{mol}$:monomer$_{mol}$, the increased ICA concentration and increased $H2_{PP}$ synergistically increase the polyolefin production.

Figure 2:
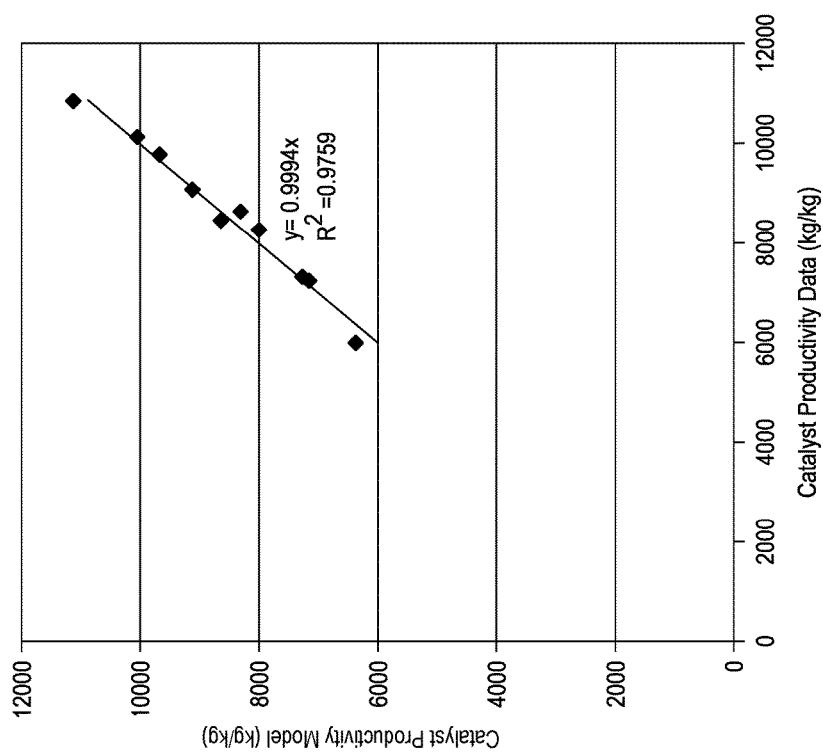
FIG. 2 provides a comparison of the modeled data to the laboratory data for a series of polyolefin production runs.

In another example, the data from the above examples was compared to a catalyst productivity regression (Equation 1). FIG. 2 provides a comparison of the modeled data to the laboratory data, which shows that the catalyst productivity regression is in good agreement with the laboratory data.

$$Prod = K*\left(\frac{H2}{C2}\right)^a *(IC5_{pp})^b *\theta/(1+\theta\{k_d + k_{ca300}*CA_{ppm}\}) \qquad \text{Equation 1}$$

where: Prod is catalyst productivity, kg polyolefin/kg catalyst

H2/C2 is hydrogen to ethylene gas ration, ppm/mol %

$IC5_{PP}$ is isopentane partial pressure, psi $k_d$ is a catalyst deactivation coefficient, 1/h (0.4 1/h)

$k_{ca300}$ is a deactivation due to UT-CA-300 (a white mineral oil additive that results in some deactivation of the catalyst), 1/h/ppm UT-CA-300 (0.0053 1/h/ppm UT-CA-300)

$CA_{ppm}$ is the concentration of UT-CA-300 in the reactor, ppm

θ is reactor residence time, hr

K, a, and b are coefficients (4528 1/h, 0.234, and 0.070, respectively)

Figure 3:
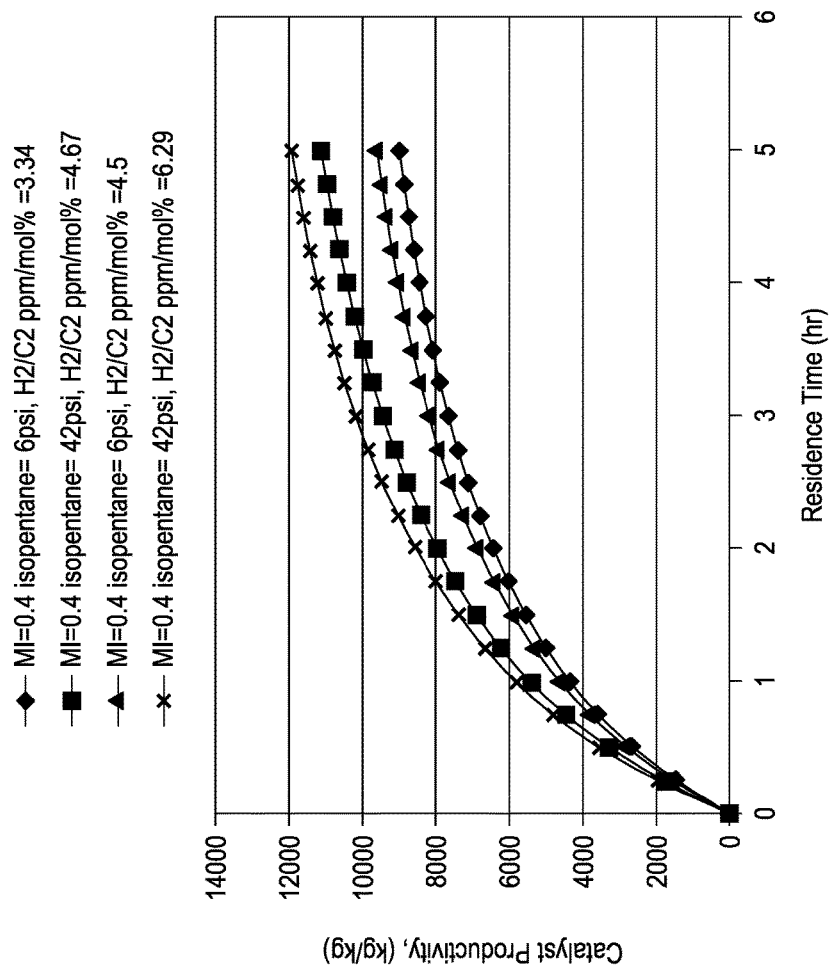
FIG. 3 is a plot of productivity as a function of residence time for four different reaction conditions.

Additionally, the relationship between productivity and residence time was investigated using the catalyst productivity regression and is illustrated in FIG. 3. The regression was used to calculate catalyst productivity as a function of residence time for four different reaction conditions, which are provided in FIG. 3. The results illustrate that increasing the isopentane partial pressure and the H2/C2, while maintaining melt index, increases the catalyst productivity.

Figure 4:
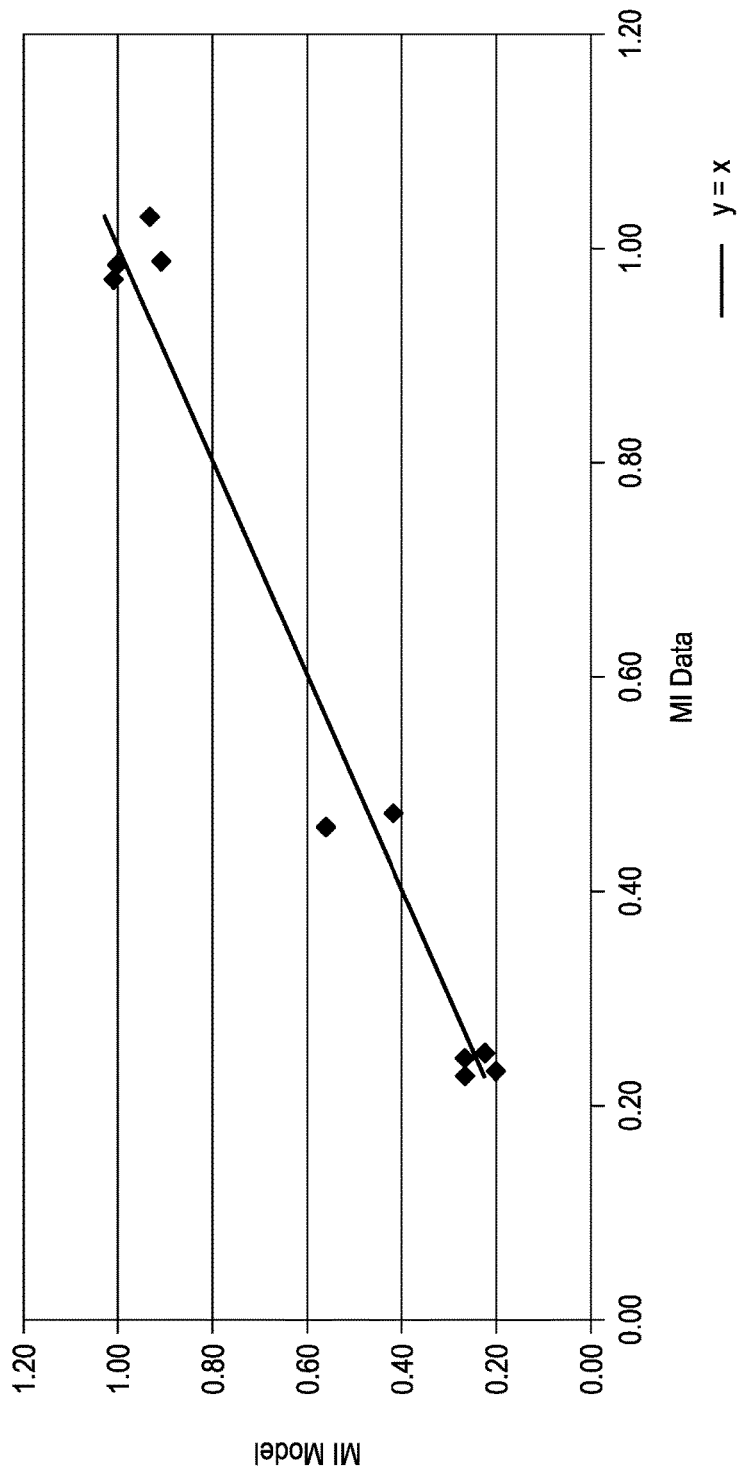
FIG. 4 is a plot of the melt index modeled versus melt index data with an overlay of y=x.
Figure 5:
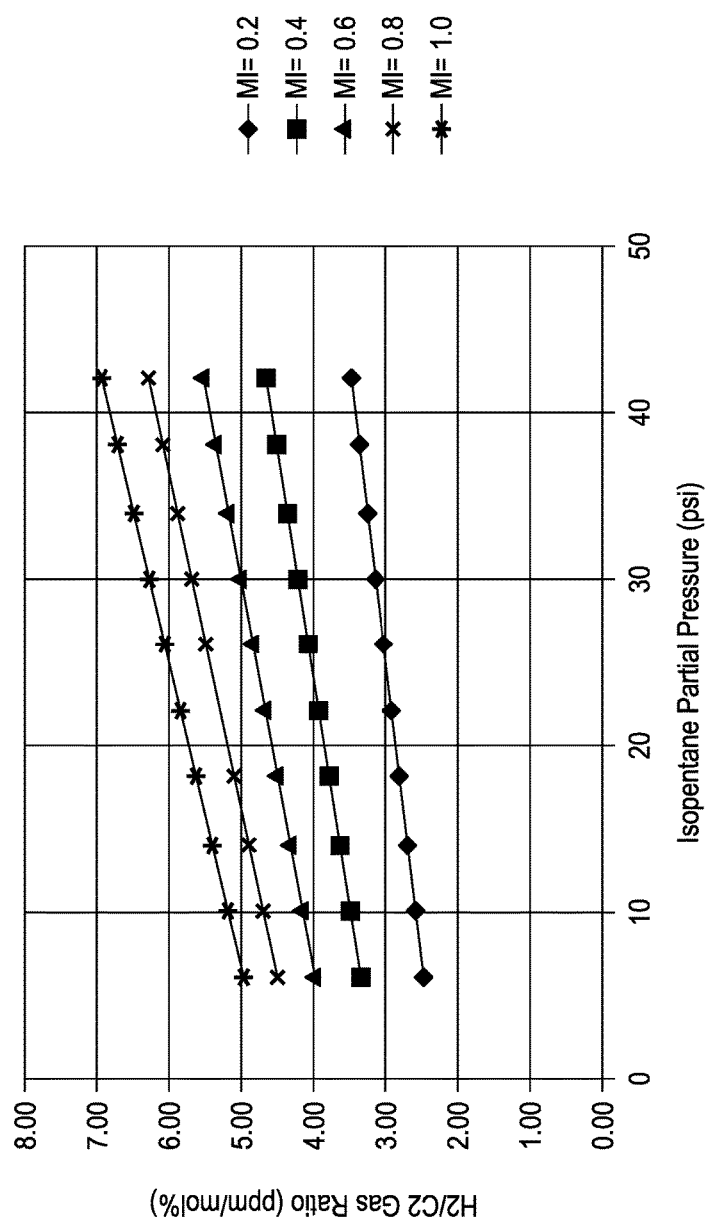
FIG. 5 is a plot of calculated results for the relationship between the H2/C2 (ppm/mol %) and isopentane partial pressure at various melt index values.

The melt index modeled versus melt index data was plotted with an overlay of y=x (FIG. 4). Statistical analysis of the modeled versus data yield a T-stat greater than 2 and an $r_2$ of 0.96, which indicates that the H2/C2 (ppm/mol %) and isopentane partial pressure terms are statistically significant and demonstrates that the melt index increases with increasing H2/C2 (ppm/mol %) and decreases with increasing isopentane partial pressure. Additionally, the isopentane partial pressure coefficient is negative, which indicates that to maintain a constant melt index the H2/C2 (ppm/mol %) should be increased during transitions when the isopentane concentration increases. FIG. 5 is a plot of calculated results for the relationship between the H2/C2 (ppm/mol %) and isopentane partial pressure at various melt index values.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   contacting in a fluidized bed gas phase reactor an olefin monomer with a catalyst system in the presence of an induced condensing agent (ICA) to produce a first polyolefin having a first melt index;
   increasing a partial pressure of the ICA in the reactor to produce a second polyolefin having a second melt index; and
   bringing or maintaining the second melt index to within 10% of the first melt index by a step consisting essentially of changing a partial pressure of olefin monomer in the reactor.

2. The method of claim 1, wherein the catalyst system is a bimodal catalyst system.

3. The method of claim 2, wherein the bimodal catalyst system includes a high molecular weight (HMW) catalyst and a low molecular weight (LMW) catalyst, and wherein the method further includes adjusting a mole ratio of the HMW catalyst and the LMW catalyst ($HMW_{mol}:LMW_{mol}$) in the reactor.

4. The method of claim 3, wherein the method further includes decreasing the $HMW_{mol}:LMW_{mol}$ ratio.

5. The method of claim 3, wherein the method further includes adding more LMW catalyst.

6. The method of claim 3, wherein the LMW catalyst comprises a metallocene catalyst.

7. The method of claim 3, wherein the LMW catalyst comprises a hafnium metallocene catalyst.

8. The method of claim 3, wherein the HMW catalyst comprises a Group 15 atom and metal containing compound.

9. The method of claim 3, wherein at least a portion of the LMW catalyst is added as a trim catalyst.

10. The method of claim 1, wherein the partial pressure of olefin monomer in the reactor is increased.

11. The method of claim 1, wherein the partial pressure of olefin monomer in the reactor is decreased.

12. The method of claim 2, wherein the bimodal catalyst system comprises a metallocene catalyst and a non-metallocene catalyst.

13. The method of claim 1, wherein hydrogen is not added to the reactor system.

14. The method of claim 1, wherein hydrogen is added to the reactor system and a ratio of a hydrogen mol % of total reactor gas to an olefin monomer mol % of total reactor gas is maintained constant.

15. The method of claim 1, wherein hydrogen is added to the reactor system and a ratio of a hydrogen mol % of total reactor gas to an olefin monomer mol % of total reactor gas is decreased.

16. The method of claim 1, wherein hydrogen is added to the reactor system and a ratio of a hydrogen mol % of total reactor gas to an olefin monomer mol % of total reactor gas is increased.

17. The method of claim 1, wherein the olefin monomer is ethylene and at least one comonomer, wherein the at least one comonomer is selected from the group consisting of propylene, 1-butene, 1-pentene, 1-hexene, 1-heptene, 1-octene, 4-methylpent-1-ene, 1-decene, 1-dodecene, 1-hexadecene, 1,3-hexadiene, 1,4-hexadiene, cyclopentadiene, dicyclopentadiene, 4-vinylcyclohex-1-ene, methyloctadiene, 1-methyl-1,6-octadiene, 7-methyl-1,6-octadiene, 1,5-cyclooctadiene, norbornadiene, ethylidene norbornene, 5-vinylidene-2-norbornene, 5-vinyl-2-norbornene, isoprene, styrene, butadiene, isobutylene, chloroprene, acrylonitrile, and a cyclic olefin.

* * * * *